United States Patent
Beckman

[11] Patent Number: 6,120,059
[45] Date of Patent: *Sep. 19, 2000

[54] VEHICLE FRAME ASSEMBLY

[75] Inventor: John A. Beckman, Wernersville, Pa.

[73] Assignee: Dana Corporation, Toledo, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/869,051

[22] Filed: Jun. 4, 1997

[51] Int. Cl.$^7$ .............................. B62D 21/00; B60K 5/12
[52] U.S. Cl. .................... 280/785; 180/312; 296/205; 29/897.2
[58] Field of Search ............................ 280/784, 785, 280/781; 180/299, 297, 291, 312, 232; 296/194, 204, 205; 29/897.2

[56] References Cited

U.S. PATENT DOCUMENTS

| | | |
|---|---|---|
| 630,054 | 8/1899 | Heymann et al. . |
| 1,992,710 | 2/1935 | Matthaei . |
| 2,269,452 | 1/1942 | Ford et al. . |
| 2,954,998 | 10/1960 | Kushler et al. . |
| 3,022,846 | 2/1962 | Thompson . |
| 3,176,786 | 4/1965 | Seidl . |
| 3,441,289 | 4/1969 | Frantz et al. .............................. 280/788 |
| 3,826,326 | 7/1974 | Blair . |
| 4,040,640 | 8/1977 | Begg ........................................ 280/785 |
| 4,240,517 | 12/1980 | Harlow et al. ............................ 180/295 |
| 4,263,980 | 4/1981 | Harlow et al. ............................ 180/292 |
| 4,406,343 | 9/1983 | Harasaki .................................. 180/297 |
| 4,440,435 | 4/1984 | Norlin ...................................... 296/188 |
| 4,453,740 | 6/1984 | von der Ohe et al. . |
| 4,521,049 | 6/1985 | Genma et al. . |
| 4,567,743 | 2/1986 | Cudini . |
| 4,744,237 | 5/1988 | Cudini . |
| 4,799,708 | 1/1989 | Handa et al. . |
| 5,005,864 | 4/1991 | Chachere . |
| 5,096,010 | 3/1992 | Ojala et al. .............................. 180/299 |
| 5,107,693 | 4/1992 | Olszewski et al. . |
| 5,332,281 | 7/1994 | Janotik et al. . |
| 5,339,667 | 8/1994 | Shah et al. . |
| 5,364,128 | 11/1994 | Ide . |
| 5,398,533 | 3/1995 | Shimanovski et al. . |
| 5,454,453 | 10/1995 | Meyer et al. . |
| 5,882,039 | 3/1999 | Beckman et al. ........................ 280/781 |
| 5,884,722 | 3/1999 | Durand et al. ........................... 180/312 |
| 6,003,935 | 12/1999 | Kalazny .................................... 296/204 |

*Primary Examiner*—Paul N. Dickson
*Attorney, Agent, or Firm*—MacMillan, Sobanski & Todd, LLC

[57] ABSTRACT

An engine cradle for use in a vehicle frame assembly is described wherein the integral central portion of an engine cradle is provided towards the rear end of the vehicle/body frame assembly such that the leg portions of the engine cradle extend forwardly therefrom. The central portion of the engine cradle is formed integrally with the legs to form a single unitary "U"-shaped member. A separate cross member is provided which extends between the two leg portions of the engine cradle and is secured thereto.

8 Claims, 3 Drawing Sheets

VEHICLE FRAME ASSEMBLY

BACKGROUND OF THE INVENTION

This invention relates in general to body and frame assemblies for vehicles. More specifically, this invention relates to an improved structure for a combined engine cradle and cross member structure for use with such a vehicular body and frame assembly.

Virtually all land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modem vehicles, such as automobiles and minivans.

In both types of body and frame assemblies, it is known to provide a specialized structure for supporting the engine of the vehicle thereon. This engine support structure, which is commonly referred to as an engine cradle, is frequently embodied as a generally U-shaped member having a central portion and a pair of leg portions. Engine mount portions and body mount portions are formed at various locations on the engine cradle. The engine mount portions are provided for facilitating the connection of the engine to the cradle, while the body mount portions are provided for facilitating the connection of the cradle to the body and frame assembly. Usually, bolts or similar fasteners are used to provide the various connections between the engine, the cradle, and the body and frame assembly. Thus, the engine cradle securely supports the engine on the body and frame assembly of the vehicle during use.

When assembling the engine cradle with the remainder of the body and frame assembly, it is typical to orient the engine cradle such that the central portion of the U-shaped engine cradle is located at the front end of the assembly and the leg portions extend rearwardly therefrom. A separate cross member can be secured adjacent the rear end of the engine cradle, extending between the two leg portions to provide desirable lateral and torsional rigidity. It has been found that this engine cradle structure provides the maximum stiffness and rigidity at the front end thereof, where the central portion of the U-shaped engine cradle extends between the two leg portions. Although this structure has been found to be effective, it would be desirable to provide an improved structure for a vehicle frame assembly wherein the maximum stiffness and rigidity is provided at the junction of the U-shaped engine cradle with the remainder of the vehicle frame assembly.

SUMMARY OF THE INVENTION

This invention relates to an improved structure for a vehicle frame assembly containing an engine cradle. The engine cradle includes a central portion and a pair of leg portions which extend from the central portion to form a generally U-shaped member. The leg portions are formed integrally with the central portion to form a single unitary engine cradle. When the engine cradle is assembled in the vehicle frame assembly, the engine cradle faces forward such that the leg portions are located axially forward of the central portion and the central portion forms a rear portion of the engine cradle. A cross member is provided which extends between the leg portions of the engine cradle and is secured thereto. This structure is superior because it provides maximum stiffness at the rear of the engine cradle, where most stresses are encountered.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
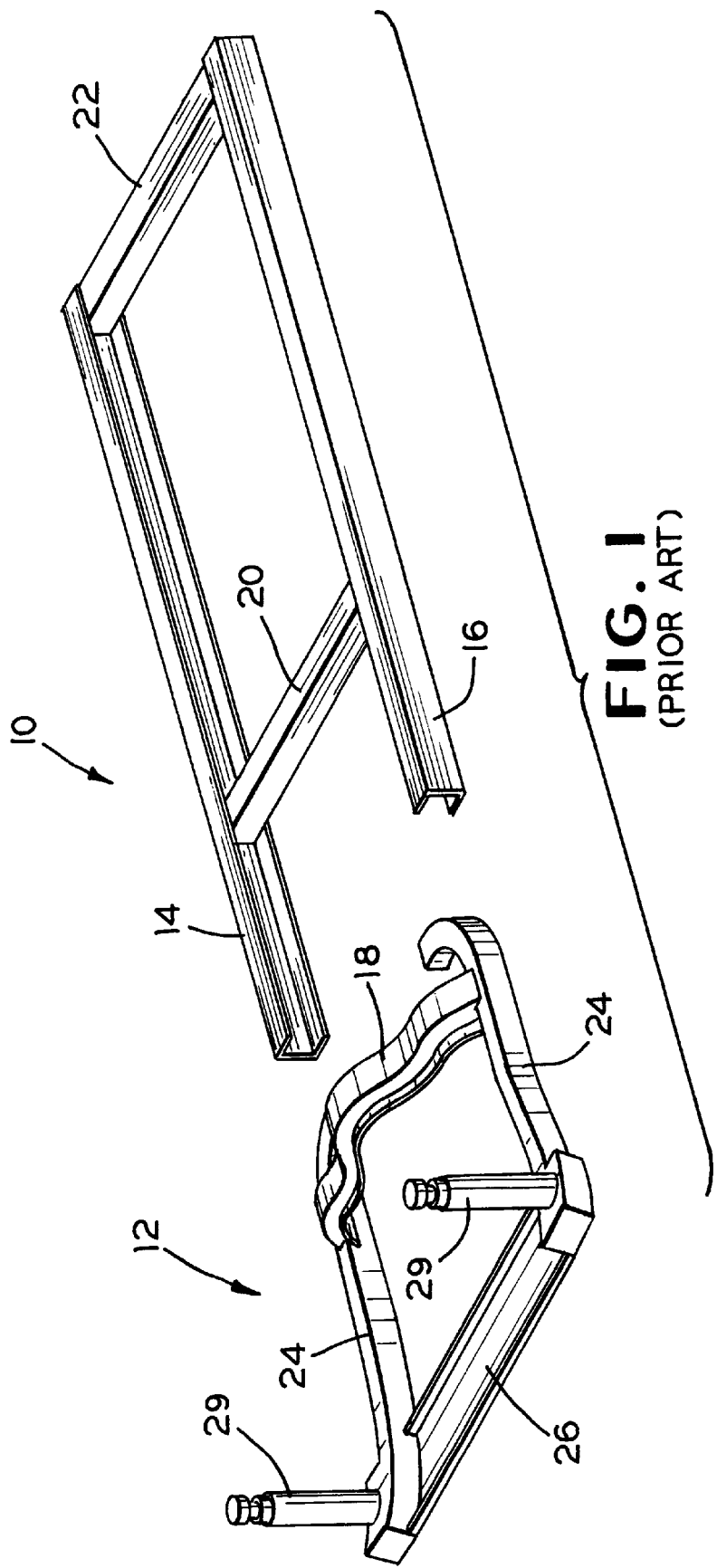
FIG. 1 is a schematic perspective view of a prior art vehicle frame assembly including a rearwardly facing engine cradle.

Referring now to the drawings, there is illustrated in FIG. 1 a prior art vehicle frame assembly, indicated generally at 10. The prior art vehicle frame assembly 10 includes a generally U-shaped engine cradle, indicated generally at 12 which is located at the front end of the vehicle frame assembly 10. The structure of the engine cradle 12 will be explained in greater detail below. The rear end of the vehicle frame assembly 10 includes a pair of longitudinally extending side rails 14 and 16 that extend rearwardly from the engine cradle 12. A plurality of cross members 18, 20, and 22 extend transversely between portions of the engine cradle 12 and the side rails 14 and 16. The side rails 14 and 16 extend axially along the length of the vehicle and generally parallel to each other. In the illustrated embodiment, two of the cross members 20 and 22 extend in a generally transverse and lateral direction between the two side rails 14 and 16 in spaced parallel relationship with respect to one another. Thus, the pair of side rails 14 and 16 and the cross members 20 and 22 form a generally rectangular ladder type perimeter frame, which constitutes the rear portion of the vehicle frame assembly 10. The side rails 14 and 16 and the cross members 18, 20, and 22 are all conventional in the art and are intended to be representative of any known rear portion for a vehicle frame assembly 10.

The prior art engine cradle 12 includes a pair of spaced apart leg portions 24 that are connected together by a transversely extending central portion 26. As shown in FIG. 1, it is known to form the leg portions 24 and the central portion 26 as separate components secured together to form the U-shaped engine cradle 12. More recently, however, it has been found convenient to form the leg portions 24 and the central portion 26 from a single tubular member, such as by hydroforming. In either event, it is customary to orient the engine cradle 12 in the rearwardly facing manner shown in FIG. 1, wherein the central portion 26 of the engine cradle 12 is located forwardly and the leg portions 24 extend rearwardly therefrom. The leg portions 24 of the engine cradle 12 are respectively connected to the side rails 14 and 16 by any conventional method, such as by welding, bolting, riveting, and the like.

The illustrated cross member 18 extends transversely between the leg portions 24 of the engine cradle 12. This cross member 18 is usually provided at the rear end of the engine cradle 12 adjacent to the point of connection between the engine cradle 12 and the side rails 14 and 16 to provide desirable lateral and torsional rigidity. The cross member 18 can be secured to the leg portions 24 of the engine cradle 12 by any known method, such as by welding, bolting, and the like. At the front end of the engine cradle 12, a pair of upstanding posts 29 are provided. Typically, the posts 29 are embodied as separate tubular members which are secured, such as by welding, to the forward end of the engine cradle 12. The posts 29 are provided to facilitate the attachment of the body of the vehicle to the vehicle frame assembly 10.

Figure 2:
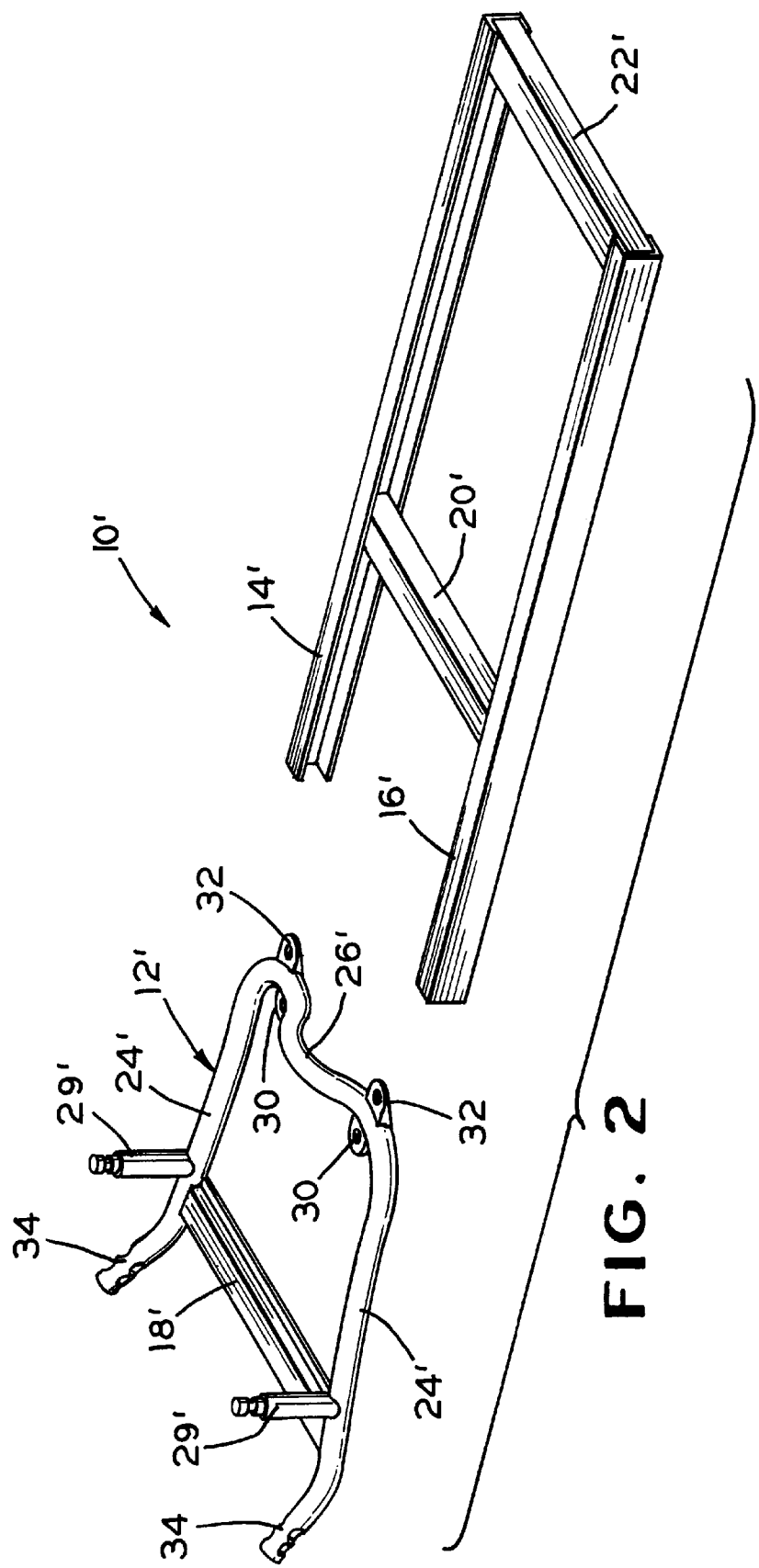
FIG. 2 is a schematic perspective of a vehicle frame assembly in accordance with this invention including a forwardly facing engine cradle.

Referring now to FIG. 2, there is illustrated a vehicle frame assembly, indicated generally at 10', in accordance with this invention. As shown therein, the vehicle frame assembly 10' includes an engine cradle, indicated generally at 12', which forms the front section of the vehicle frame assembly 10'. In the vehicle frame assembly 10' shown in FIG. 2, the engine cradle 12' is formed as a unitary structure from a single tubular member such that the central portion 26' is integral with each of the leg portions 24'. The engine cradle 12' is connected to a generally rectangular ladder type perimeter frame structure, including a pair of axially-extending side rails 14' and 16' having transversely extending cross members 20' and 22' extending therebetween.

The engine cradle 12' is oriented in the forwardly facing manner shown in FIG. 2, wherein the central portion 26' of the engine cradle 12' is located rearwardly and the leg portions 24' extend forwardly therefrom. Thus, the forward ends of the side rails 14' and 16' are connected to the central portion 26' of the engine cradle 12'. The side rails 14' and 16' can be secured to the engine cradle 12' by any conventional means, such as by welding, bolting, riveting, adhesive bonding, and the like. In the illustrated embodiment, each of the side rails 14' and 16' is formed as a generally C-shaped, open channel member, wherein the open sides of the side rails 14' and 16' face inwardly toward one another. Thus, the side rails 14' and 16' can be adapted to fit around the outer perimeter of the central portion 26' of the engine cradle 12' to facilitate attachment thereto.

In the illustrated vehicle frame assembly 10' of this invention, the integral central portion 26' of the engine cradle 12' is located at the junction between the forward and rearward ends of the vehicle frame assembly 10', which is the location where most stresses are encountered during operation of the vehicle. Thus, the forwardly facing orientation and the unitary structure of the engine cradle 12' provide increased lateral and torsional rigidity and improved reliability to the vehicle frame assembly 10'. The rigidity of the engine cradle 12' is further increased by a cross member 18' which extends between the legs 24' near the front or open end of the engine cradle 12'. Because of the increased rigidity and reliability of the illustrated engine cradle 12' a number of vehicle components may be secured thereto.

Figure 3:
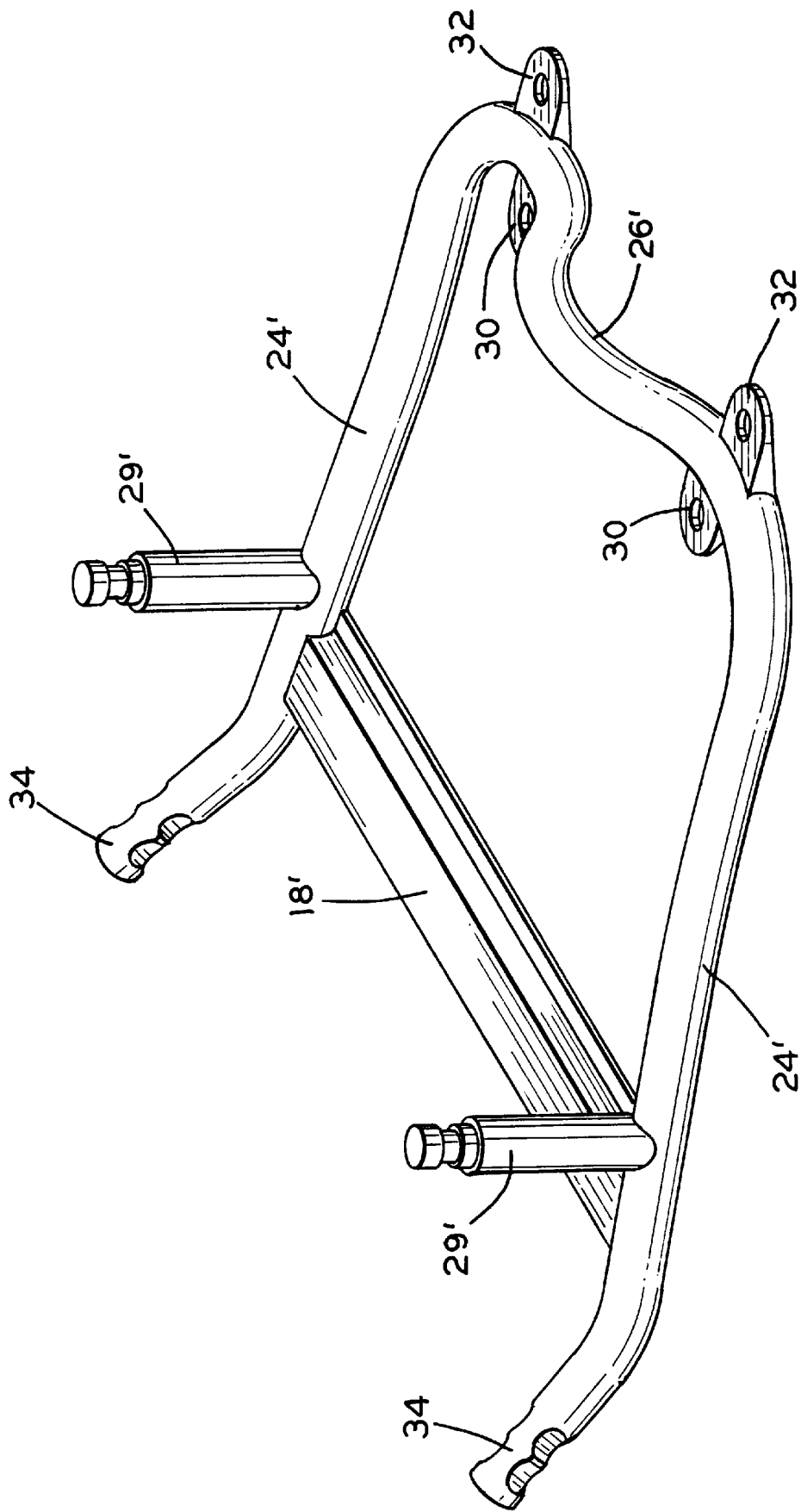
FIG. 3 is an enlarged perspective view of the engine cradle illustrated in FIG. 2.

A detailed view of the engine cradle 12' is shown in FIG. 3. As shown therein, a number of mounting brackets 30 and 32 may be connected to the central portion 26' on both the forward side and the rear side thereof, respectively. As shown therein, the brackets 30 may be used to secure the steering gear system (not shown) to the vehicle frame assembly 10'. Similarly, the brackets 32 may be used to mount the engine, transmission, or other systems (none of which are shown) to the vehicle frame. In a preferred embodiment, as will be discussed in detail below, the mounting brackets 30 and 32 are formed integrally with the engine cradle 12'. Alternatively, the brackets 30 and 32 may be formed as separate structures and secured to the central portion 26' of the engine cradle 10' by any of the known attachment methods discussed above. Furthermore, additional brackets (not shown) may be connected to one or both of the leg portions 24' and the central portion 26'.

As further shown in FIGS. 2 and 3, the forwardly extending leg portions 24' of the engine cradle 12' may be angled upwardly to form two integral front body mount posts 29' for facilitating the attachment of the front end of the vehicle body (not shown) to the engine cradle 12'. In addition, each of the legs 24' of the engine cradle 12' may include an extension portion 34 which is located axially forward of the cross member 18'. The extensions 34 may be flattened on the ends thereof to facilitate the attachment of other vehicle components thereto. As further shown therein, the cross member 18' is positioned to extend between the legs 24' such that it is located adjacent the posts 29'. The cross member 18' may be located axially forward of the posts 29' as illustrated or axially rearward of the posts 29'. Preferably, the upstanding post portions 29' and/or the extensions 34 are formed integrally with the engine cradle 12' as discussed below.

In a preferred embodiment, the engine cradle 12' is formed using a hydroforming process. In general, the process of hydroforming involves placing a deformable hollow member in a die and then expanding the member into the size and shape of the die by the application of a pressurized fluid internally within the hollow member. More specifically, the deformable hollow member is usually metallic stock material, such as tubular stock, square stock or sheet material. The apparatus used in a hydroforming process is similar to conventional dies and typically includes two or more die halves which together form a die cavity having the desired size and shape of the final product. The die cavity of a hydroforming apparatus can be designed to have any shape and size. Therefore, the hydroforming process is especially advantageous for manufacturing complex shaped products. In addition, the hydroforming process allows the illustrated engine cradle 12' to be formed as a single structure having the desired U-shape and other shape features described above without requiring any welding or other joining techniques.

In operation, the engine cradle 12' is manufactured by first pre-forming a piece of tubular stock (not shown) into a generally U-shaped configuration. The bends initially formed during this pre-forming process usually may not have the exact angles and shapes which result in the final product. Instead, these initial pre-formed bends allow the stock piece to be generally aligned with the shape of the hydroforming dies when positioned therein. As such, when the pre-formed stock is placed in the hydroforming die, the die may physically deform the stock into the desired shape before any hydroforming occurs. Once the hydroforming die is closed around the stock material, end fittings are secured to each end of the pre-formed starting piece and pressurized fluid is supplied to the interior thereof. The hydroforming die may be configured to include recesses and protuberances as necessary to form the mounting brackets 30 and 32, the posts 29', or the extensions 34 of the legs 24'. As such, the engine cradle 12' formed by this process includes unique shape features which are repeatable dimensionally with each successive engine cradle formed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing an engine cradle and vehicle frame assembly comprising the steps of:
   (a) providing a single tubular member;
   (b) deforming the single tubular member to have a generally U-shaped configuration including a transversely extending central portion and first and second leg portions extending longitudinally from the central portion;
   (c) securing a transversely extending cross member between the first and second leg portions;
   (d) providing a vehicle frame section including a pair of longitudinally extending side rails having a cross member extending transversely therebetween; and
   (e) securing the side rails of the vehicle frame section to the central portion of the single tubular member to form the engine cradle and vehicle frame assembly.

2. The method defined in claim 1 wherein said step (b) is performed by hydroforming.

3. The method defined in claim 1 wherein said step (b) is performed by pre-bending the single tubular member to a preliminary configuration, then hydroforming the pre-bent member to a final configuration.

4. The method defined in claim 1 wherein said step (c) includes the further step of securing a body mount post to each of the first and second leg portions.

5. The method defined in claim 1 wherein said step (c) is performed by securing the transversely extending cross member at intermediate locations of the first and second leg portions so as to provide respective extension portions on the first and second leg portions.

6. The method defined in claim 1 wherein said step (b) is performed by deforming the single tubular member such that the first and second leg portions have angled end portions.

7. The method defined in claim 6 wherein said step (c) is performed by securing the transversely extending cross member at intermediate locations of the first and second leg portions such that the angled end portions are provided as extension portions on the first and second leg portions.

8. The method defined in claim 1 wherein said step (d) is performed by providing a vehicle frame section including a pair of longitudinally extending side rails having a plurality of cross members extending transversely therebetween.

* * * * *